(12) United States Patent
Williams

(10) Patent No.: US 7,285,072 B2
(45) Date of Patent: Oct. 23, 2007

(54) VEHICLE CONTROL SYSTEM

(75) Inventor: Andrew Williams, Uttoxeter (GB)

(73) Assignee: JCB Landpower Limited, Uttoxeter (GB)

( * ) Notice: Subject to any disclaimer, the term of this patent is extended or adjusted under 35 U.S.C. 154(b) by 133 days.

(21) Appl. No.: 11/124,774

(22) Filed: May 9, 2005

(65) Prior Publication Data

US 2006/0252597 A1 Nov. 9, 2006

(30) Foreign Application Priority Data

May 12, 2004 (GB) .................................. 0410550.8

(51) Int. Cl.
*B60W 10/04* (2006.01)
(52) U.S. Cl. ...................................................... 477/108
(58) Field of Classification Search ................ 477/107, 477/108; 180/178
See application file for complete search history.

(56) References Cited

U.S. PATENT DOCUMENTS

| 4,648,040 A | 3/1987 | Cornell |
| 4,740,898 A * | 4/1988 | McKee et al. ................. 701/70 |
| 4,771,656 A | 9/1988 | Itoh |
| 5,406,483 A | 4/1995 | Kallis |
| 6,553,302 B2 * | 4/2003 | Goodnight et al. ........... 701/54 |
| 6,704,637 B1 | 3/2004 | Hrazdera et al. |
| 2002/0010534 A1 | 1/2002 | Goodnight et al. |

FOREIGN PATENT DOCUMENTS

EP 0967107 A1 12/1999

* cited by examiner

*Primary Examiner*—Dirk Wright
(74) *Attorney, Agent, or Firm*—Marshall, Gerstein & Borun LLP

(57) ABSTRACT

A control system for a vehicle, the vehicle including an engine, a variable transmission for varying the transmission ratio between an output member of the engine and a ground engaging drive apparatus, the control system including at least one control apparatus which is operative to provide inputs to a controller, the controller being responsive to inputs from the control apparatus when the control system is operating in a first operating mode, to provide output signals to vary the engine speed, and when the control system is operating in a second operating mode, to provide output signals to vary the transmission ratio without changing the engine speed, and a mode selector control whereby an operator may select the first or second operating mode.

21 Claims, 1 Drawing Sheet

VEHICLE CONTROL SYSTEM

BACKGROUND TO THE INVENTION

This invention relates to a control system for a vehicle, a vehicle having such a control system, and to a method of operating such a control system.

More particularly the invention relates to a control system for a vehicle which includes an engine, a transmission such as a continuously variable transmission ("CVT") for varying the transmission ratio between an output member of the engine and a ground engaging drive apparatus, which may be a pair of wheels, one carried at or towards either-end of an axle.

DESCRIPTION OF THE PRIOR ART

Such vehicles are commonly used for powering agricultural equipment for example, which typically is powered by the vehicle engine. Thus the vehicle may include a power take off (PTO) which is driven by the engine output member so that there is a fixed ratio of rotational speed of the PTO to the rotational speed of the engine output member, the PTO driving the agricultural or other equipment. However, a PTO may be driven through a gearbox which permits the fixed ratio to be changed by selecting a desired gear train, to suit different equipment to be driven.

Agricultural equipment driven by a PTO, such as a mower for example only, tends to be designed to be driven at a set rotational speed for optimum performance; other agricultural equipment, such as a plough for example, may require the vehicle to be driven at a desired speed over the ground for optimum performance.

Control systems for such vehicles are known which include a control such as a foot pedal control, and commonly a hand control too, which is/are operable to vary the engine speed. The hand control is typically used to set the engine speed as appropriate for the PTO powered equipment, and once set, the control system may be programmed to maintain engine speed as a priority over vehicle speed which may be selected by selecting a transmission ratio, e.g. using a joystick control. In such use the foot pedal control tends not to be used, as operating this will vary the engine speed which is undesirable as this affects the PTO rotational speed.

However, where a changing load is encountered, for example during mowing, an operator may need to intervene to maintain the engine speed and thus PTO speed, e.g. to increase vehicle speed where the load lightens, or vice versa, e.g. by changing the transmission ratio by operating the joystick or other control to reduce vehicle speed to allow more power to be available for the PTO.

Alternatively, control systems are known in which there is no requirement to maintain the engine speed for any PTO. The vehicle speed may be set, for example by selecting a transmission ratio on a hand operated joystick control for a set engine speed. The system may be programmed so that once the vehicle speed is set, the vehicle speed may be maintained as a priority over engine speed. Again though, where a changing load is encountered, operator intervention may be required to maintain the vehicle speed, e.g. by changing the engine speed and/or the transmission ratio.

SUMMARY OF THE INVENTION

According to a first aspect of the invention we provide a control system for a vehicle, the vehicle including an engine, a variable transmission for varying the transmission ratio between an output member of the engine and a ground engaging drive apparatus, the control system including at least one control apparatus which is operative to provide inputs to a controller, the controller being responsive to inputs from the control apparatus when the control system is operating in a first operating mode, to provide output signals to vary the engine speed, and when the control system is operating in a second operating mode, to provide output signals to vary the transmission-ratio without changing the engine speed, and a mode selector control whereby an operator may select the first or second operating mode.

The control apparatus may most conveniently include a foot pedal although alternatively or additionally, the control apparatus may include a hand operated device.

Where the control apparatus includes a foot pedal, it will be appreciated that the pedal may be depressed to provide the input to the controller indicative of either an alternative vehicle speed higher than the desired vehicle speed, and an alternative engine speed higher than the desired engine speed, and when released, the pedal may include a pedal return device to return the pedal to its original position at which the controller may provide output signals to the variable transmission to return the vehicle speed to the originally indicated desired vehicle speed, or to the engine speed controller to return the engine speed to the originally indicated desired engine speed, depending upon the selected operational mode.

Where the control apparatus includes a hand operated device, this may be operated instead of the foot pedal, to vary respectively, the vehicle speed and the engine speed.

In a preferred arrangement, the control apparatus includes both a foot pedal and a hand operated device, the hand operated device, being used to provide the input to the controller indicative of the desired engine speed, and the foot pedal being operable in the first operating mode to provide an input to the controller indicative of an alternative desired engine speed, and in the second operating mode to provide an input to the controller indicative of an alternative vehicle speed. The operation of the hand operated device in either operating mode may be overriding of any other control.

In such an arrangement, the control system would require a further control apparatus, such as may be provided by a joystick control lever, to provide the input to the controller indicative of the desired vehicle speed when the control system is operating or is to be operated in its second operating mode.

The mode selector control may be a simple switch, or may be operated alternatively or additionally to respond to other inputs, to switch the operating mode.

For example, by default, the control system may operate in the first operating mode until the mode selector control is operated to select the second operating mode, and the control system may return to the first operating mode in the event of one or more of:

operation of the hand control device such as to indicate an alternative engine speed having more or less than a predetermined difference (e.g. 10% difference) to the engine speed selected when the control system was switched to the second operating mode;
operation of the hand control device to an idle position;
operation of the further control apparatus which would adjust the vehicle speed;
selecting an alternative operational control mode.

According to a second aspect of the invention we provide a vehicle including a control system according to the first aspect of the invention.

According to a third aspect of the invention we provide a method of operating a control system of a vehicle according to the first aspect of the invention, the method including operating the vehicle in the first operating mode, engaging a PTO, operating the mode selector control to change the operating mode from the first operating mode to the second operating mode, and then operating the vehicle in the second operating mode.

According to a fourth aspect of the invention we provide a method of operating a control system for a vehicle, the vehicle including an engine, a variable transmission for varying the transmission ratio between an output member of the engine and a ground engaging drive apparatus, the control system including a programmable controller, the method including providing an input to the controller indicative of a desired engine speed, providing an input to the controller indicative of a desired vehicle speed, monitoring the engine speed and the vehicle speed and providing respective input signals to the controller indicative of the engine speed and the vehicle speed, comparing the respective desired and monitored engine and vehicle speeds, and providing output signals to an engine speed controller to vary the engine speed to maintain the engine speed at or close to the desired engine speed, and providing output signals to the variable transmission, the output signals to the variable transmission being either first output signals to the variable transmission to vary the vehicle speed to maintain the vehicle speed at or close to the desired vehicle speed for the desired engine speed, or where operating conditions do not permit the engine speed to be maintained at or close to the desired engine speed for the desired vehicle speed, the output signals to the variable transmission being second output signals to maintain or reduce the vehicle speed so that the engine speed is maintained at or close to the desired engine speed.

The control system may include a control apparatus which may be operated by the operator to provide the input to the controller indicative of the desired vehicle speed, and the method may include varying the desired vehicle speed in use, by operating the control apparatus, to select an alternative desired vehicle speed, the controller responding by providing first or second output signals to the variable transmission depending upon whether operating conditions permit the engine speed to be maintained at or close to the desired engine speed for the alternative desired vehicle speed.

For example, the control apparatus may include a foot pedal, although alternatively or additionally, the control apparatus may include a hand operated device. Where the control apparatus includes a foot pedal, it will be appreciated that the pedal may be depressed to provide the input to the controller indicative of an alternative desired vehicle speed higher than the desired vehicle speed, and when released, the pedal may include a pedal return device to return the pedal to its original position at which the controller may provide output signals to the variable transmission to return the vehicle speed to the originally indicated desired vehicle speed.

The method may include operating the control system in a first operating mode in which the controller is responsive to inputs from the control apparatus to provide output signals to an engine speed controller to vary the engine speed, and operating a mode selector control to select a second operating mode in which the controller is responsive to inputs from the control apparatus to provide the first or second output signals to the variable transmission.

According to a fifth aspect of the invention we provide a method of operating a control system for a vehicle, the vehicle including an engine, a variable transmission for varying the transmission ratio between an output member of the engine and a ground engaging drive apparatus, the control system including a programmable controller, the method including providing an input to the controller indicative of a desired engine speed, providing an input to the controller indicative of a desired vehicle speed, monitoring the engine speed and the vehicle speed and providing respective input signals to the controller indicative of the engine speed and the vehicle speed, comparing the respective desired and monitored engine and vehicle speeds, and providing output signals to the variable transmission to vary the vehicle speed to maintain the vehicle speed at or close to the desired vehicle speed, and providing output signals to an engine speed controller, the output signals to the engine speed controller being either first output signals to the engine speed controller to vary the engine speed to maintain the engine speed at or close to the desired engine speed for the desired vehicle speed, or where operating conditions do not permit the vehicle speed to be maintained at or close to the desired vehicle speed for the desired engine speed, the output signals to the engine speed controller being second output signals to increase the engine speed so that the vehicle speed is maintained at or close to the desired vehicle speed.

The control system may include a control apparatus [foot pedal] which may be operated by the operator to provide the input to the controller indicative of the desired engine speed, and the method may include varying the desired engine speed in use, by operating the control apparatus, to select an alternative desired engine speed, the controller responding by providing first or second output signals to the engine speed controller depending upon whether operating conditions permit the vehicle speed to be maintained at or close to the desired vehicle speed for the alternative desired engine speed.

For example, the control apparatus may include a foot pedal, although alternatively or additionally, the control may include a hand operated device. Where the control apparatus includes a foot pedal, it will be appreciated that the pedal may be depressed to provide the input to the controller indicative of an alternative engine speed higher than the desired engine speed, and when released, the pedal may include a pedal return device to return the pedal to its original position at which the controller may provide output signals to the engine speed controller to return the engine speed to the originally indicated desired engine speed.

The method may include operating the control system in a first operating mode in which the controller is responsive to inputs from the control apparatus to provide output signals to the variable transmission to vary the vehicle speed, and operating a mode selector control to select a second operating mode in which the controller is responsive to inputs from the control apparatus to provide the first or second output signals to the engine speed controller.

BRIEF DESCRIPTION OF THE DRAWINGS

Embodiments of the invention will now be described with reference to the accompanying drawings in which.

DESCRIPTION OF THE PREFERRED EMBODIMENTS

Figure 1:
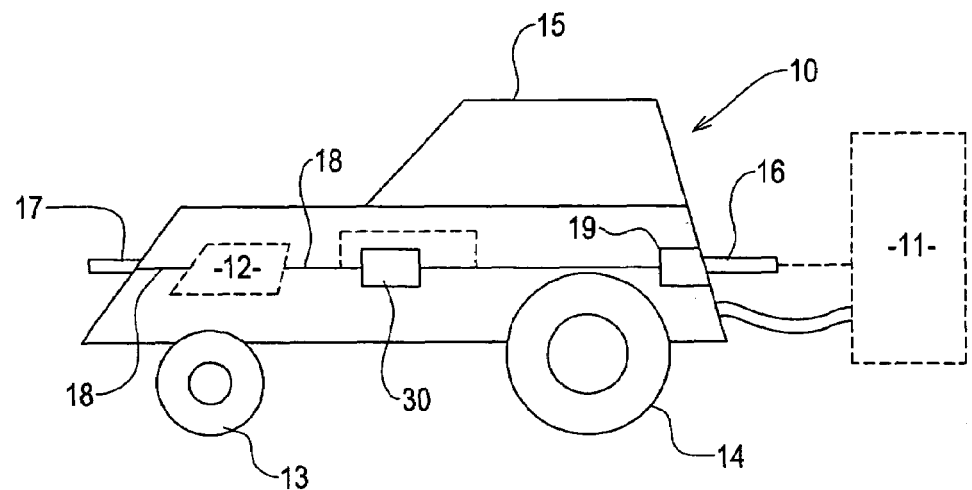
FIG. 1 is an illustrative side view of a vehicle having a control system in accordance with the invention.

Referring to the drawings, a control system 20 for a vehicle 10 is shown.

The vehicle 10 may typically be a tractor for example, which may be moveable over the ground whilst agricultural equipment 11 (shown in phantom lines only) is powered from an engine 12 of the tractor 10. In this embodiment, the tractor 10 is of the kind having wheels, for example four wheels arranged in pairs 13, 14 on front and rear axles of the vehicle 10, the wheels providing a ground engaging apparatus by means of which drive may be transmitted to the ground.

The tractor 10 may be drivable and otherwise controlled by an operator within an operator's cab 15. The agricultural equipment 11 is driven from a PTO 16 at a rear of the tractor 10, although in this example, the tractor 10 includes a PTO 17 at a front of the tractor 10 too. Each PTO 16, 17 is driven from an engine output member 18, such as a crankshaft and one or both of the PTOs 16, 17 may include a gearbox 19. In each case, the driven speed of the or the respective PTO 16, 17 will be a fixed ratio of the engine 12 speed, at least for a selected fixed gear ratio selected or constrained by the gearbox 19. The rear PTO 16 and gearbox 19 where provided, may be driven through a transmission 30 as shown in full lines, or directly from the engine 12 as indicated in dotted lines.

The control system 20 includes an electronic control unit ("ECU") 22 to which various inputs are provided and which in response, generates control outputs.

The tractor 10 includes within the cab 15, a control apparatus 21 which includes in this example, both a foot pedal 24 and a hand operated device 25, either of which may be operated as described below to provide inputs to the ECU 22. Also within the cab 15 there is a further control apparatus 26 which typically may be a joystick. The joystick control apparatus 26 may be moveable about at least one axis to effect inputs to the ECU 22, and may have selector controls 28a to 28d on a button pad for example, to provide further inputs to the ECU 22.

The tractor 10 also includes a monitoring apparatus 27, such as a first sensor S1 to sense vehicle speed, and a second sensor S2 to monitor engine 12 speed.

Between the engine 12 and the wheels 13, 14 or at least one of the pair of wheels 13, 14, there is a transmission 30 which enables the transmission ratio from engine output member 18 to a pair or both pairs of the wheels 13 and/or 14 to be varied. Preferably the transmission 30 is a CVT which is controlled by the ECU 22 continuously to vary the transmission ratio so that different vehicle speeds may be achieved for the same engine speed.

Operation of the vehicle 10 in first and second alternative operating modes will now be described.

Figure 2:
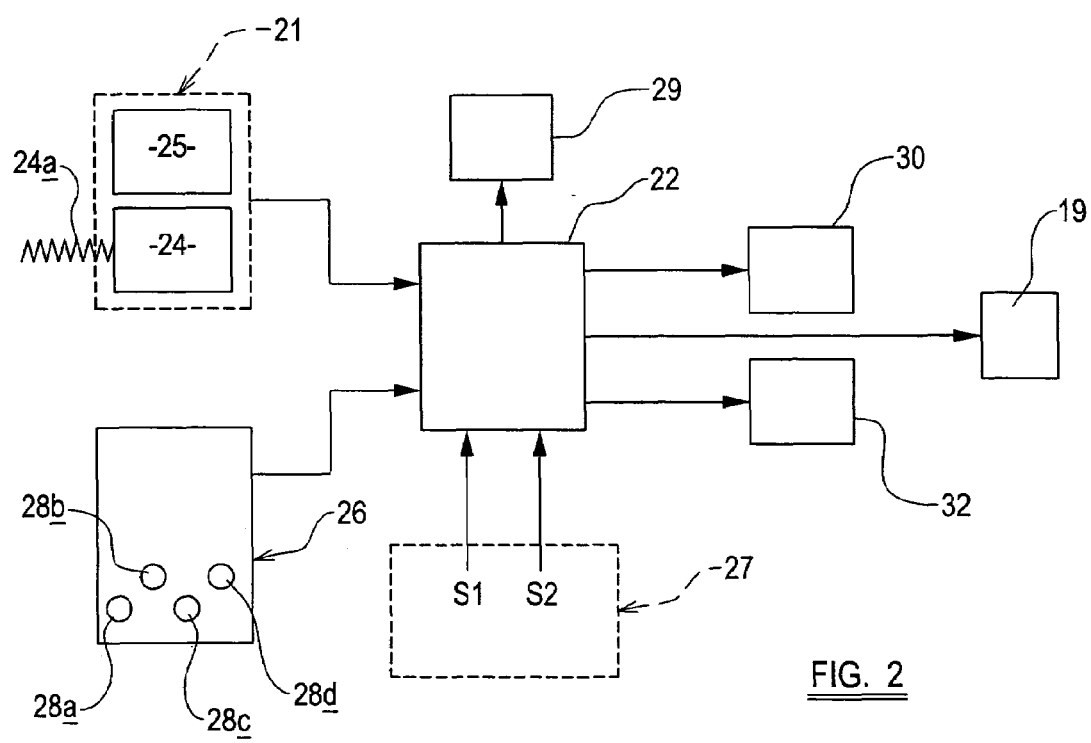
FIG. 2 which is an illustrative diagram of a control system for the vehicle of FIG. 1, which may be operated in accordance with the invention.

In a first mode of operation, which will be referred to as travelling mode, the PTO(s) 16, 17 are inoperative. This may be achieved mechanically for example by disengagement of gears within the gearbox 19, or electromechanically by disconnection of an electrically operated clutch or the like, as desired. In FIG. 2, it is indicated that the ECU 22 may control a gearbox 19 actuator.

Travelling mode may be selected by operating a travelling mode selector control button, e.g. the button indicated at 28a on the joystick control apparatus 26. In this mode an operator may drive the vehicle at a desired vehicle speed, by setting on the joystick control apparatus 26, a desired transmission ratio, e.g. by moving the joystick control 28 about an operating axis so that the joystick control apparatus 26 provides relevant inputs to the ECU 22. The ECU 22 may display the desired transmission ratio on a display 29. The operator may then depress the foot pedal 24 at will, to a desired extent to achieve the desired vehicle speed. Depressing the foot pedal 24 will provide further inputs to the ECU 22 which responds by providing relevant outputs to an engine speed controller 32 which increases/decreases engine speed e.g. by changing the amount of fuel injected into the engine 12.

Thus the foot pedal 24 provides inputs to the ECU 22 to which the ECU 22 responds by changing the engine 12 speed.

Travelling mode typically is selected when the tractor 10 is travelling e.g. on road surfaces, although the tractor 10 may be towing a trailer or the agricultural or other equipment 11, with the PTO 16, 17 inoperative, or the tractor 10 may be performing a field work operation which does not require driving from a PTO 16, 17, for example, ploughing.

In a second mode of operation, which will be referred to as field mode, one (or both) of the PTOs 16, 17 may be selected, for example by depressing a field mode selector button 28b on the joystick control 26, or by operating another control elsewhere in the cab 15 or even external to the cab 15. Where the PTO selected is driven via a gearbox 19, a fixed gear ratio may be selected by the operator manually changing the gear from neutral to a selected fixed gear ratio, or preferably the ECU 22 is configured to provide an output to an actuator apparatus of the gearbox 19 so that the selected gear ratio is engaged. Where the PTO 16, 17 is driven via an electromechanical clutch, this may also or alternatively be engaged by the actuator apparatus.

In field mode, the ECU 22 controls the engine speed controller 32 and the CVT 30 preferentially to maintain a desired engine 12 speed. In this way the speed of operation of the agricultural or other powered equipment 11 may be maintained constant for optimum efficiency. However an operator may adjust the vehicle speed provided that the engine 12 speed is capable of being maintained for the operating conditions being experienced.

First, to select field mode, the operator sets the desired engine 12 speed using the hand operated device 25. This may be a simple control lever or an input button control for examples only. If desired the ECU 22 may display the desired engine speed selected on the display 29. Next the operator sets a desired vehicle speed for the selected engine speed, using the joystick control 26, the desired vehicle speed may too be displayed on display 29.

Thus when field mode is selected, the ECU 22 will provide outputs to both the CVT transmission 30 and to the engine speed controller 32, whilst monitoring the engine speed using sensor S2 and the vehicle speed using sensor S1, so that the engine speed controller 32 will increase/decrease the engine speed towards the desired engine speed, and the CVT transmission will vary the transmission ratio so that for a given engine speed, the desired vehicle speed will be attained.

In use, when a steady state has been reached, the ECU 22 will continuously monitor engine speed and vehicle speed and provide outputs to the engine speed controller 32 and to the CVT transmission 30, to maintain both the engine speed and vehicle speed as close as possible to the desired engine and vehicle speeds respectively.

If a vehicle speed is selected which it is not possible to achieve for a selected desired engine speed for prevailing operating conditions e.g. high load conditions, the ECU 22 will provide appropriate outputs to the CVT transmission 30 to maintain the vehicle speed below the desired vehicle speed, at least until the desired engine speed is attained, at which time the ECU 22 may increase the vehicle speed toward the desired vehicle speed where this will not result in a decrease in engine speed.

If in use, a higher load is encountered which at the desired vehicle speed would otherwise result in a reduction in engine speed, the ECU 22 reacts to the inputs from the sensors S2 to reduce the vehicle speed in order to give priority to and maintain the desired engine speed.

However if a lower load is encountered which at the desired engine speed would allow a higher vehicle speed, the operator may intervene in order to attain a higher vehicle speed and hence higher work rate. To achieve this, the operator may operate the foot pedal 24. Whereas in the first operating mode, operating the foot pedal 24 results in the ECU 22 output signals to the engine speed controller 32, in the second operating mode, such foot pedal 24 depression will result in the ECU 22 providing outputs to the CVT transmission 30 to increase vehicle speed by varying the transmission ratio without affecting engine speed.

Thus in the case of encountering higher loads, the ECU 22 slows the vehicle 10 in order to maintain engine 12 speed, and in the case of encountering lower loads, an operator may increase vehicle speed to attain a higher work rate without detriment to engine speed.

The foot pedal 24 includes a pedal return device such as a spring 24a. In the event that an operator depresses the foot pedal 24 to increase vehicle speed and then releases the pedal 24, the pedal will return to the original position and the ECU 22 will respond to the resulting input to reduce vehicle speed towards the desired vehicle speed, by providing appropriate outputs to the CVT transmission 30, but providing that this will not result in an increase in engine. 12 speed as the load on the engine 12 imposed by the CVT transmission 30 is reduced.

Various modifications may be made. For example, in the example described, the desired vehicle speed is set when the second operating mode is selected, by operating the hand operated device 25 of the control apparatus 21, whereas the desired vehicle speed may selected by using the foot pedal 24 of the control apparatus 21. Thus the control apparatus 21 may include only a foot pedal 24, or a hand operated device 25 may be used in the first operating mode to adjust engine 12 speed in which case the control apparatus 21 could include only a hand control device 25.

In the example described, the rear PTO 16 has been engageable. Where front and rear PTOs, or another multiple PTO arrangement is provided, a PTO may be selected by another button selector control, e.g. button 28c on the joystick control apparatus 26.

The invention may be applied to a vehicle 10 in which drive is transmitted to the ground by means other than wheels, for example by tracks or half-tracks.

In the example described above, the ECU 22 is programmed to maintain the engine 12 speed at or close to the desired engine speed, and to sacrifice maintaining the vehicle speed close to the desired vehicle speed as necessary. This preference to maintain the engine speed is to ensure that the agricultural or other equipment 11 powered from the engine 12 is driven at a constant speed. In another arrangement, where for example there is a preference for the ECU 22 to maintain the vehicle speed close to the desired vehicle speed in preference to the engine speed, the ECU 22 may be arranged to decrease engine speed when a lower load is encountered and to respond to manual inputs from the control apparatus 21, e.g. the foot pedal 24 to increase engine speed, in each case to enable a vehicle speed to be maintained at or close to the desired vehicle speed. This method can be used to increase fuel efficiency by maintaining the engine speed at or around the most efficient operating region.

It is desirable for example to maintain a constant desired vehicle speed when performing some field work tasks such a ploughing, where for example the tine angle may provide optimum ploughing performance at a rated vehicle speed.

The control system 20 described above with reference to the figures, may be changed between travelling mode, or a field operating mode in which engine speed is given priority over vehicle speed, and a field operating mode in which vehicle speed is given priority over engine speed, using another selector button, e.g. button 28d on the joystick control apparatus 26.

In each case, the control system 10 or rather the mode selector control, may respond to inputs from the control apparatus 21 when the system 10 is operating in a first operating or travelling mode to vary the vehicle speed, and in a second operating or field mode, to vary the vehicle speed or engine speed, depending upon the selected field mode i.e. engine or vehicle speed preference.

Also, in each case, field mode when selected, may be arranged to be changed back to travelling mode automatically by the ECU 22 or other controller, in the event of one or more of:

operation of the hand control device 25 such as to indicate an alternative engine speed having more or less than a predetermined difference (e.g. 10% difference) to a desired engine speed selected when the control system 10 was switched to the field operating mode;

operation of the hand control device 25 to an idle position;

operation of the further control apparatus i.e. the joystick control apparatus 26 about an operating axis, which would adjust the vehicle speed by the ECU 22 sending outputs to the CVT transmission 30;

selecting an alternative overriding control mode, for example by selecting an alternative PTO 16, 17, or an alternative field mode using for example button 28c or 28d.

The buttons 28a-28d need not be provided on or only on the further control apparatus 26, i.e. the joystick, but some or all may elsewhere be provided, preferably within the operator's cab 15.

Instead of a joystick, the further control apparatus 26 may be another kind of control, as desired, such as for example only, a button, lever, or like control.

The invention claimed is:

1. A control system for a vehicle, the vehicle including an engine, a continuously variable transmission for varying the transmission ratio between an output member of the engine and a ground engaging drive apparatus, and the vehicle including a power take-off shaft which is driveable by the engine at a fixed ratio of the engine speed, the control system including at least one control apparatus which is operative to provide inputs to a controller, the controller being responsive to inputs from the control apparatus when the control system is operating in a first operating mode, when the power take-off shaft is inoperative to provide output signals to the controller to vary the engine speed, and when the control system is operating in a second operating mode, when the power take-off shaft is operative and a desired engine speed and vehicle speed are set by an operator, responding to changes in load by providing output signals to vary the transmission ratio without changing the engine speed, and a mode selector control whereby an operator may select the first or second operating mode.

2. A system according to claim 1 wherein where the control apparatus includes a foot pedal, and a pedal return device is provided to return the pedal to its original position after the foot pedal has been depressed to increase vehicle speed from a selected desired vehicle speed, the controller in response, providing output signals to the continuously variable transmission to return the vehicle speed to the originally selected vehicle speed, or to the engine speed controller to return the engine speed to the originally selected engine speed, depending upon the selected operational mode.

3. A system according to claim 1 wherein where the control apparatus includes a hand operated device which is operable to vary respectively, the vehicle speed and the engine speed.

4. A system according to claim 1 wherein the control apparatus includes both a foot pedal and a hand operated device, the hand operated device, being used to provide the input to the controller indicative of the desired engine speed, and the foot pedal being operable in the first operating mode to provide an input to the controller indicative of an alternative desired engine speed, and in the second operating mode to provide an input to the controller indicative of an alternative vehicle speed.

5. A system according to claim 4 wherein the control system includes a further control apparatus to provide the input to the controller indicative of the desired vehicle speed when the control system is operating or is to be operated in its second operating mode.

6. A system according to claim 5 wherein the further control apparatus includes a joystick control lever.

7. A system according to claim 1 wherein the mode selector control is a simple switch.

8. A system according to claim 1 wherein the mode selector control responds to other inputs, to switch the operating mode.

9. A system according to claim 8 in which the control apparatus includes a hand operated device, wherein the control system operates in the first operating mode until the mode selector control is operated to select the second operating mode, and the control system returns to the first operating mode in the event of operation of the hand operated device such as to indicate an alternative engine speed having more or less than a predetermined difference to the engine speed selected when the control system was switched to the second operating mode.

10. A system according to claim 8 in which there is a further control apparatus to provide the input to the controller indicative of desired vehicle speed when the control system is operating or is to be operated in its second operating mode, and the control system operates in the first operating mode until the mode selector control is operated to select the second operating mode, and the control system returns to the first operating mode in the event of operation of the further control apparatus which would adjust the vehicle speed.

11. A system according to claim 8 wherein the control system operates in the first operating mode until the mode selector control is operated to select the second operating mode, and the control system returns to the first operating mode in the event that an alternative overriding control mode is selected.

12. A vehicle including a control system including an engine, a continuously variable transmission for varying the transmission ratio between an output member of the engine and a ground engaging drive apparatus, and the vehicle including a power take-off shaft which is driveable by the engine at a fixed ratio of the engine speed, the control system including at least one control apparatus which is operative to provide inputs to a controller, the controller being responsive to inputs from the control apparatus when the control system is operating in a first operating mode, when the power take-off shaft is inoperative to provide output signals to the controller to vary the engine speed, and when the control system is operating in a second operating mode, when the power take-off shaft is operative and a desired engine speed and vehicle speed are set by an operator, responding to changes in load by providing output signals to vary the transmission ratio without changing the engine speed, and a mode selector control whereby an operator may select the first or second operating mode.

13. A method of operating a control system of a vehicle which includes a control system including an engine, a continuously variable transmission for varying the transmission ratio between an output member of the engine and a ground engaging drive apparatus, and the vehicle including a power take-off shaft which is driveable by the engine at a fixed ratio of the engine speed, the control system including at least one control apparatus which is operative to provide inputs to a controller, the controller being responsive to inputs from the control apparatus when the control system is operating in a first operating mode, when the power take-off shaft is inoperative to provide output signals to the controller to vary the engine speed, and when the control system is operating in a second operating mode, when the power take-off shaft is operative and a desired engine speed and vehicle speed are set by an operator, responding to changes in load by providing output signals to vary the transmission ratio without changing the engine speed, and a mode selector control whereby an operator may select the first or second operating mode the method including operating the vehicle in the first operating mode, engaging the power take-off shaft operating the mode selector control to change the operating mode from the first operating mode to the second operating mode, and then operating the vehicle in the second operating mode.

14. A method of operating a control system for a vehicle, the vehicle including an engine, a variable transmission for varying the transmission ratio between an output member of the engine and a ground engaging drive apparatus, the control system including a programmable controller, the method including providing an input to the controller indicative of a desired engine speed, providing an input to the controller indicative of a desired vehicle speed, monitoring the engine speed and the vehicle speed and providing respective input signals to the controller indicative of the engine speed and the vehicle speed, comparing the respective desired and monitored engine and vehicle speeds, and providing output signals to an engine speed controller to vary the engine speed to maintain the engine speed at or close to the desired engine speed, and providing output signals to the variable transmission, the output signals to the variable transmission being either first output signals to the variable transmission to vary the vehicle speed to maintain the vehicle speed at or close to the desired vehicle speed for the desired engine speed, or where operating conditions do not permit the engine speed to be maintained at or close to the desired engine speed for the desired vehicle speed, the output signals to the variable transmission being second output signals to maintain or reduce the vehicle speed so that the engine speed is maintained at or close to the desired engine speed.

15. A method according to claim 14 wherein the control system includes a control apparatus which is operable by an operator to provide the input to the controller indicative of the desired vehicle speed, and the method includes varying the desired vehicle speed in use, by operating the control apparatus, to select an alternative desired vehicle speed, the controller responding by providing first or second output signals to the variable transmission depending upon whether operating conditions permit the engine speed to be maintained at or close to the desired engine speed for the alternative desired vehicle speed.

16. A method according to claim 14 wherein the control apparatus includes a foot pedal which when depressed, provides the input to the controller indicative of an alternative desired vehicle speed higher than the desired vehicle speed, the pedal including a pedal return device to return the pedal, when released, to its original position at which the controller provides output signals to the variable transmission to return the vehicle speed to the originally selected desired vehicle speed.

17. A method according to claim 15 wherein the method includes operating the control system in a first operating mode in which the controller is responsive to inputs from the control apparatus to provide output signals to an engine speed controller to vary the engine speed, and operating a mode selector control to select a second operating mode in which the controller is responsive to inputs from the control apparatus to provide the first or second output signals to the variable transmission.

18. A method of operating a control system for a vehicle, the vehicle including an engine, a continuously variable transmission for varying the transmission ratio between an output member of the engine and a ground engaging drive apparatus, the control system including a programmable controller, the method including providing an input to the controller indicative of a desired engine speed, providing an input to the controller indicative of a desired vehicle speed, monitoring the engine speed and the vehicle speed with respective monitoring devices and providing respective input signals to the controller indicative of the engine speed and the vehicle speed, comparing the respective desired and monitored engine and vehicle speeds, and providing output signals to the variable transmission to vary the vehicle speed to maintain the vehicle speed at or close to the desired vehicle speed, and providing output signals to an engine speed controller, the output signals to the engine speed controller being either first output signals to the engine speed controller to vary the engine speed to maintain the engine speed at or close to the desired engine speed for the desired vehicle speed, or where operating conditions do not permit the vehicle speed to be maintained at or close to the desired vehicle speed for the desired engine speed, the output signals to the engine speed controller being second output signals to increase the engine speed so that the vehicle speed is maintained at or close to the desired vehicle speed.

19. A method according to claim 18 wherein the control system includes a control apparatus which is operable by an operator to provide the input to the controller indicative of the desired engine speed, and the method including varying the desired engine speed in use, by operating the control apparatus, to select an alternative desired engine speed, the controller responding by providing first or second output signals to the engine speed controller depending upon whether operating conditions permit the vehicle speed to be maintained at or close to the desired vehicle speed for the alternative desired engine speed.

20. A method according to claim 18 wherein the control apparatus includes a foot pedal which when depressed, provides the input to the controller indicative of an alternative engine speed higher than the desired engine speed, and the pedal including a pedal return device to return the pedal when released, to its original position at which the controller provides output signals to the engine speed controller to return the engine speed to the originally indicated selected engine speed.

21. A method according to claim 18 wherein the method includes operating the control system in a first operating mode in which the controller is responsive to inputs from the control apparatus to provide output signals to the variable transmission to vary the vehicle speed, and operating a mode selector control to select a second operating mode in which the controller is responsive to inputs from the control apparatus to provide the first or second output signals to the engine speed controller.

* * * * *